United States Patent [19]

Wreede et al.

[11] Patent Number: 4,878,719
[45] Date of Patent: Nov. 7, 1989

[54] AUTOMOTIVE WHEEL COVERS WITH SPATIALLY STABILIZED IMAGES

[75] Inventors: John E. Wreede, Monrovia; James E. Scott, Los Angeles; Richard B. Upper, Studio City, all of Calif.

[73] Assignee: Hughes Aircraft Company, Los Angeles, Calif.

[21] Appl. No.: 285,458

[22] Filed: Dec. 15, 1988

[51] Int. Cl.[4] .............................................. G03H 1/26
[52] U.S. Cl. .................................. 350/3.75; 350/3.77; 350/3.79
[58] Field of Search ................... 350/3.75, 3.77, 3.78, 350/3.79; 362/78

[56] References Cited

U.S. PATENT DOCUMENTS

| | | | |
|---|---|---|---|
| 3,746,783 | 7/1973 | Gerritsen et al. | 350/3.79 |
| 3,914,544 | 10/1975 | Watanabe et al. | 350/3.79 |
| 4,021,606 | 5/1977 | Takeda et al. | 350/3.75 |
| 4,381,537 | 4/1983 | Hinrichs | 362/78 |

Primary Examiner—Bruce Y. Arnold
Assistant Examiner—Terry S. Callaghan
Attorney, Agent, or Firm—Leonard A. Alkov; Wanda Denson-Low

[57] ABSTRACT

A vehicle wheel cover is provided with a reflection-type hologram assembly having multiple exposure images therein. The sun or an artificial light source illuminates the hologram assembly as it rotates as a result of the vehicle moving. The exposure images are successively reconstructed to produce a single image that may be remotely positioned from and stationary relative to the rotating wheel cover.

19 Claims, 2 Drawing Sheets

AUTOMOTIVE WHEEL COVERS WITH SPATIALLY STABILIZED IMAGES

BACKGROUND OF THE INVENTION

1. Field of the Invention

The present invention relates generally to vehicular wheel covers and, more specifically, to an improved wheel cover that provides spatially stabilized emblematic images which are viewable when a vehicle is stopped or moving.

2. Description of the Prior Art

For decades, automobile manufacturers have, like most other manufacturers, faced the problem of advertising their products with logos on the products themselves. Automobile manufacturers have at times utilized hood ornaments configured in the form of the manufacturer's logo. However, as the concern for aerodynamics became more important, the use of hood ornaments to display the manufacturer's logo became less prevalent. Through all of this, automobile manufacturers continued to place their logos on the hubcaps or wheel covers of the vehicles.

Perhaps in recognition of the problems or ineffectiveness attendant upon putting logos on hubcaps or wheel covers, manufacturers have now tended to dispense with logos. One problem with using the wheel covers to display a logo is that the logo can become indiscernible when the vehicle is moving, particularly at moderate to high speeds. Furthermore, even when the vehicle is moving at very low speeds, the rotation of the wheel cover, and thus the emblematic logo, produces a blurred or rotating image that is not highly desirable. As such, a logo on a hubcap has provided advertising benefits essentially only when the vehicle has stopped, so that it can be viewed by someone directly facing the hubcap.

A need still exists in the art to provide a hubcap or wheel cover that can produce a substantially nonblurring image of a logo that remains stationary relative to the rotation of the hubcap or wheel cover.

SUMMARY OF THE INVENTION

The present invention seeks to overcome deficiencies in the prior art by providing a wheel cover or hubcap that can produce spatially stabilized images, including those of a manufacturer's logo. A plurality of holograms stacked upon one another, or a plurality of exposures in a single layer of film, or a plurality of pie-shaped holograms disposed in a wheel configuration are utilized for providing substantially a single image of the logo, for example. The holograms are of the reflection type that can be illuminated by sunlight or by an artificial light source which can be placed, for example, in the wheelwell area of the vehicle. Each hologram is capable of producing the same image as the others, and each has a relatively small reconstruction angle for illumination purposes. Further, each hologram is angularly offset from one another. Thereby, as the wheel cover rotates, the holograms rotate with it and the holograms sequentially become reconstructed to provide substantially one image of the logo. As each frame passes through that angle at which the hologram can be reconstructed through an exit pupil to a viewer in, for example, less than 1/30 of a second, a smooth, uninterrupted image of the logo would appear. The image is seen not only when the car is at a stop, but also as the car moves in the range of slow to high speeds.

These and other objects of the present invention can best be seen from an examination of the accompanying specification, claims and drawings hereto.

DESCRIPTION OF THE PREFERRED EMBODIMENTS

The following description is provided to enable any person skilled in the art to which the present invention pertains, or with which it is most nearly connected, to make and use the same, and sets forth the best mode contemplated by the inventors of carrying out their invention. Various modifications, however, will remain readily apparent to those skilled in the art, since the generic principles of the present invention have been defined herein specifically to provide a hubcap or wheel cover with spatially stabilized images.

Figure 1:
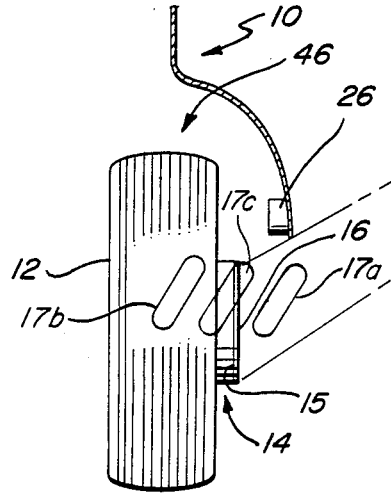
FIG. 1 is a side view of the present invention which can be utilized with a sunlight source or an artificial light source.

FIG. 1 is a side view of the present invention which is incorporated into a commercially standard vehicle 10. Part of the vehicle 10 includes a standard wheel 12 having a conventionally designed wheel cover 14 mounted thereon. As in conventional vehicles, the wheel cover 14 rotates with the wheel 12 as the vehicle 10 moves. Also, as with many standard wheel covers, the wheel cover 14 has a flat exterior portion 15 that faces away from the wheel 12. The exterior portion 15 is utilized as a support member upon which a hologram assembly 16 can be affixed. Of course, as will be evident from the description below, the wheel cover 14 may be specifically designed to support a particular sized and/or configured hologram assembly 16.

Figure 2:
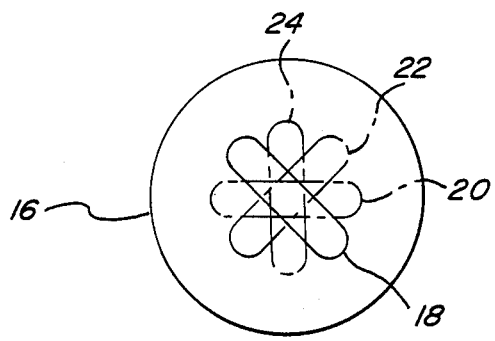
FIG. 2 is a plan view of a hologram assembly according to a first preferred embodiment of the present invention.
Figure 6:
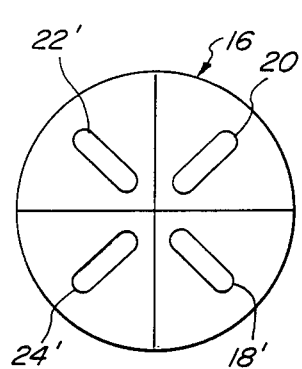
FIG. 6 is a plan view of a hologram assembly according to a second preferred embodiment of the present invention.

The hologram assembly 16 includes, in one embodiment, a plurality of hologram elements stacked upon one another in a multilayered configuration (FIG. 7), further described below, to produce a single three-dimensional image 17 of a vehicle manufacturer's logo, for example. In another embodiment, the hologram assembly 16 is a single hologram element or film with multiple, overlapping exposures (FIG. 2). In yet another embodiment, the hologram assembly 16 includes a plurality of similarly dimensioned pie-shaped hologram elements positioned relative to one another in the form of a wheel (FIG. 6). Each hologram element includes a single exposure which is identical to the others. Furthermore, it is contemplated that instead of individual pie-shaped units, a single hologram is provided with multiple exposures disposed equidistant to each other near a circumferential edge of the hologram and at equal radial distances. However, by having multiple pie-shaped holograms, individual ones can be removed from the assembly 16 and then discarded such as when an individual hologram unit is damaged. Thereby, a replacement unit can be inserted and keep the remainder of the assembly 16 usable. In contrast to a single or layered assembly 16, damage to one section may necessitate discarding the whole assembly 16.

In any of the three embodiments, the image or logo 17 can be a real image 17a, a virtual image 17b, or a part virtual and part real image (i.e., real/virtual image) 17c, as depicted in FIG. 1. Whether the real or virtual or real/virtual image is produced depends on the position of the object (or an image of the object) in the hologram construction system (FIG. 3), as is known in the art.

The real image 17a can be seen by a viewer looking directly at the wheel cover 14, i.e., from the right side of FIG. 1. When so viewed, the image 17a appears to be in front of the wheel cover 14. The virtual image 17b can also be seen by the viewer looking directly at the wheel cover 14. In this instance, the logo 17b will appear to be inset in the wheel 12. As with the images 17a, b, the real/virtual image 17c can be seen by a viewer looking directly at the wheel cover 14. So viewed, the logo 17c appears to split a plane of the hologram assembly 16. The logo 17c is generally preferable over the other two logos 17a, b, at least to the extent that it more nearly simulates the position of a conventionally designed logo on a hubcap.

The logo 17 is re-created by illumination of the hologram assembly 16 by either a sunlight source 28 or an artificial light source 26. A wheelwell area 46 is described in part by a standard designed fender of the vehicle 10 or may be specifically configured and dimensioned to maximize the amount of sunlight from the source 28 impinging upon the hologram assembly 16. Preferably, the wheelwell area 46 is also constructed to enable sunlight to reach the hologram assembly 16 at a maximum number of hours throughout the day.

As an alternative to, or even in addition to, the provision for illumination by sunlight, an artificial light source 26 can be provided within the wheelwell area 46 for illumination of the hologram assembly 16. Preferably, the light source 26 is affixed to the fender and is an extended or point source incandescent lamp which might be powered by a battery conventionally provided in the vehicle 10 or perhaps by a battery source (not shown) immediately adjacent the light source 26. In any event, the artificial light source 26 could be utilized during the evening when the sun is absent, or perhaps during the day when the sunlight source 28 is being blocked, such as by clouds.

As noted above, the hologram assembly 16 can be made up of a plurality of exposures in a single hologram element, such as that depicted in FIG. 2. By way of example, the hologram assembly 16 shown in FIG. 2 includes a first exposure image 18, a second exposure image 20, a third exposure image 22 and a fourth exposure image 24. This type of multiple exposure is well known in the art, as shown and used, for example, in package price reading assemblies that utilize bar code scanners having multiple holographic optical elements. The single hologram element, in this specific embodiment, is a reflection-type hologram such as one that may be produced by glass and dichromated gelatin, as is well known in the art. A transmission-type hologram may also be used, but, as can be appreciated by those skilled in the art, it would not be able to readily utilize sunlight. Since the image 17 need not be of very high quality, the considerations of low cost and mass production can be of more importance. Consequently, other suitable materials for the hologram assembly may include photographic silver halide film (holographic quality), dichromated gelatin, and photopolymers such as DuPont's HRF (holographic recording film) or Polaroid's DMP-128. In mass production, it could be possible to emboss the holographic pattern in a thermoplastic such as vinyl. The assembly 16 might also be placed on a backing of mylar or on the wheel cover 14 itself. Typical embossing methods that can be employed are shown in references such as National Geographic, March 1984, p. 372.

Figure 7:
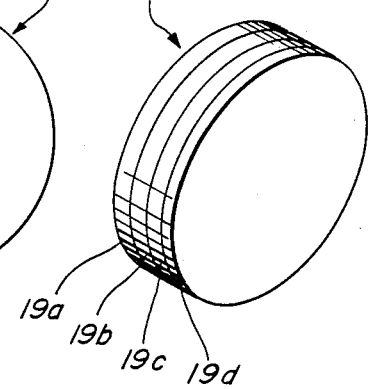
FIG. 7 is a perspective view of a hologram assembly according to a third preferred embodiment of the present invention.

If, instead of multiple exposures, multiple hologram elements are utilized, they may be placed together in a layered fashion, one on top of the other, with each containing an interference pattern or exposure image that can produce the image 17. For purposes of example, FIG. 7 shows four layered hologram elements 19a, b, c, d. The hologram elements can be adhered to one another preferably by polyvinyl butyral, an adhesive used in windshields, or any other suitable optical cement. And as with the single hologram above, the multiple holograms can be constructed of photographic silver halide film, dichromated gelatin, and photopolymers. However, embossing in this instance may not be particularly suitable. Since embossing is a surface effect, the intermediate surfaces in the layered construction might be degraded.

In the case of the radially cut or pie-shaped hologram assembly 16 (FIG. 6), the materials utilized could be the same as those for the other embodiments. Further, embossing as above could be employed.

In all of the preferred embodiments, each of the hologram elements is produced so that a reconstruction range of illumination angles is limited. In this particular embodiment, the reconstruction range is about 5 degrees or less for the use of four hologram elements or exposures. Also, the exposures, whether in a single, layered, or pie-shaped hologram, are preferably offset with one another in an angular direction (FIGS. 2 and 6) by equidistant amounts.

As such, the hologram assembly 16, whether single, layered, or pie-shaped, is illuminated while it rotates on the wheel cover 14 and produces substantially only a single image 17. In FIG. 2, the first exposure image 18, as well as an image of the logo which is produced, is represented in unbroken lines. The remaining three exposure images 20, 22, 24, as a result of the limited reconstruction angles, are not producing any, or at least not a significant, image of the logo. However, as the hologram assembly 16 continues to rotate, the exposure images will sequentially produce a single image in substantially the same position, which is in front of the wheel cover 14 in the instance of the real image 17a. In FIG. 2, if the hologram assembly 16 were rotating in a counterclockwise direction and the hologram assembly 16 was being illuminated by a stationary light source, the first exposure image 18 would move out of its reconstruction range and discontinue producing the logo 17. At the same time, the fourth image 24 will rotate into its appropriate reconstruction range, and thus produce the logo 17 in substantially the same position and orientation as did the first image 18. The same type of reproduction of the logo 17 would then follow with the third exposure 22, and then the second exposure 20.

It can be appreciated that the hologram assembly 16 having the radially cut configurations in a wheel provides a substantially identical exposure sequence. As depicted in FIG. 6, if the wheel assembly 16 were rotating in a counterclockwise direction, the first image exposure 18' would be reconstructed, and then followed by the fourth exposure 24', the third exposure 22', and finally, the second exposure 20'. While the first exposure 18' is directly opposite the third exposure 22', only one of them will re-create an image, because of the methods of constructing the hologram which, among other things, relate to reference beam angular position, and existing pupil location and size, as is known in the art. The same selected re-creation applies to the oppositely positioned second and fourth exposures 20', 24'.

As can also be appreciated, the number of hologram elements or exposure images can be altered according to the efficiency at which the logo 17 is sought to be produced. With fewer hologram elements or exposure images, the cost of production is lowered. On the other hand, as the number of hologram elements or exposure images increases, the clarity of the logo 17 is increased. A larger number of hologram elements or exposure images will reduce the amount of dead time that might exist between one exposure producing the image and the next successive exposure producing the image. Accordingly, a larger number of equally spaced exposures will substantially eliminate a strobe-type image that might otherwise result if very few exposures were used. This would allow image 17 viewing at slow speeds. Of course, as the speed of the vehicle 10 increases, the problem of dead time between re-creation decreases, and thus the image has less of an appearance of blinking. Preferably, for a vehicle whose speed might vary between 0–60 mph, 12 exposures can be used which are equally spaced apart in an angular direction.

Figure 3:
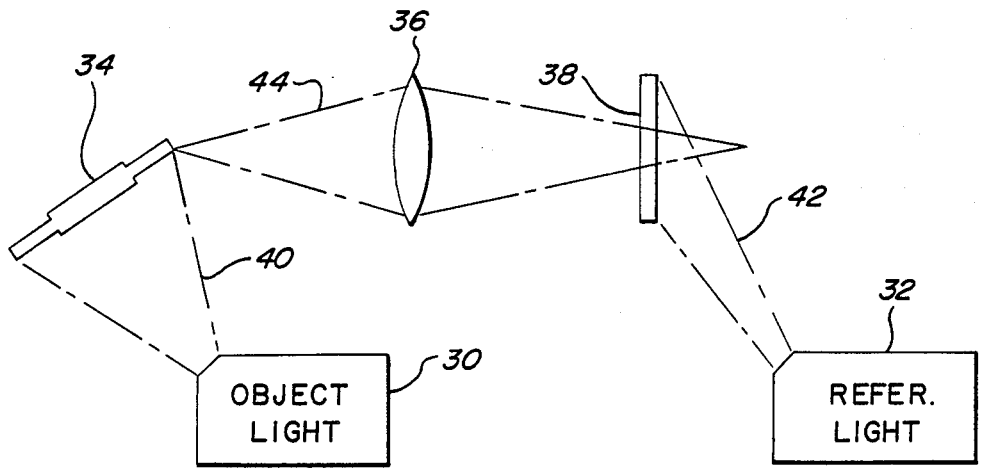
FIG. 3 depicts an exposure system for producing the hologram assembly according to the present invention.

Referring to FIG. 3, the hologram assembly 16 for the above embodiments may be constructed by illuminating an object 34 with an object light source 30. Illumination of the object 34 thereby produces a reflected beam 44. A relay lens 36 can be used to focus the reflected beam 44 to a point past a photographic plate 38. At the same time, a reference light source 32 produces a reference beam 42 which produces an interference pattern at the photographic plate 38 with the reflected object beam 44. This is but one example of a conventionally-designed reflection-type hologram for use in the present invention. Artisans will understand that other methods could be appropriate for producing the holograms.

Figure 4:
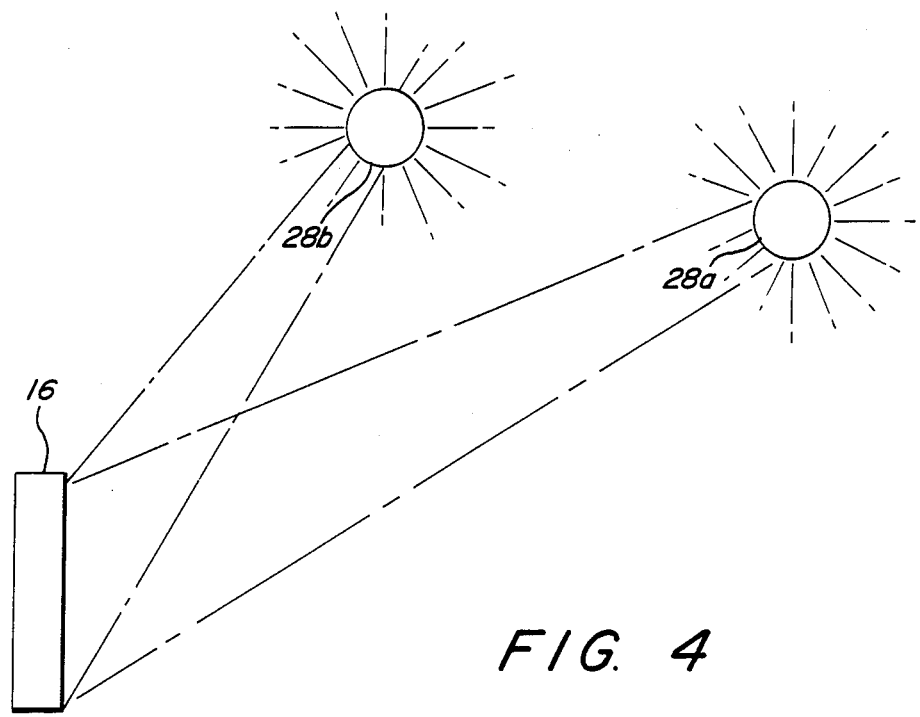
FIG. 4 depicts a moving illumination source of sunlight according to the present invention.
Figure 5:
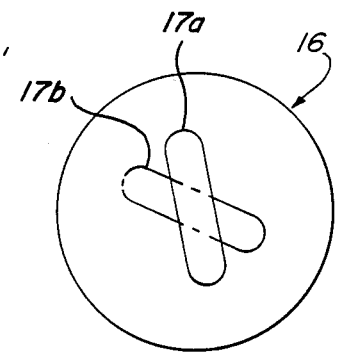
FIG. 5 depicts the movement of a virtual image produced according to the present invention under the conditions of a moving illumination source.

In the event that the hologram assembly 16 is to be illuminated only by the sunlight source 28, the illumination source position will probably continue to change throughout the day. Assuming for purposes of illustration that the vehicle 10 remains stationary, at an initial time $t_o$, the sunlight source 28 may be at a position indicated by reference numeral 28a in FIG. 4. At a time $t_n$, the sunlight source may be designated at a position indicated by reference numeral 28b. While the sunlight source 28 moves relative to the hologram assembly 16, an image 17 continues to be produced, as shown in FIG. 5. For example, when the sunlight source is at 28a, the image 17 produced is designated as 17a in FIG. 5. When the sunlight source is at 28b, the image 17 is designated in phantom lines in FIG. 5 as reference numeral 17b. As can be seen, the image continues to be produced as the sunlight source moves, although it is produced at a different point in time and, thus, its angular position simply changes.

In another embodiment of the present invention, rather than having the hologram assembly 16 composed of a plurality of identical exposures therein, the hologram assembly 16 includes different exposures. In this fashion, the hologram assembly 16 may then be made capable of producing what appears to be a moving image. For example, if it is desired that a running horse be produced, the multiple exposures or multiple hologram elements can include different images of a running horse in a single running cycle. Thereby, the successive illumination of the exposures produces an image of a horse running.

To protect the hologram assembly 16, a protective element (not shown) such as glass, mylar, polycarbonate, and other clear polymers can be affixed to the surface of the hologram assembly 16 which is exposed to the light source. It may be affixed by materials such as a heat-sealable adhesive, like polyvinyl butyral. In this way, the hologram assembly 16 is protected from road dirt and other foreign material that might otherwise become embedded in the hologram assembly 16 and blur the virtual image 17.

As shown from the above, the present invention provides an apparatus for producing a three-dimensional image that is stabilized relative to a rotating body, which in this case is a wheel cover. The stationary image can be seen from various angles while the vehicle is either stopped or moving.

The above only describes certain preferred embodiments of the present invention, and it is contemplated that various modifications to the above can be effected, but nevertheless come within the scope of the present invention as defined by the claims.

What is claimed is:

1. In a vehicle, an improved wheel system that provides an emblem image relative to a rotating wheel, the improvement comprising:
   a wheel cover member fixed on and rotatable with the rotating wheel; and
   a hologram assembly fixed to said wheel cover member so that said hologram assembly may be exposed to sunlight, said hologram assembly having a plurality of exposures therein, each of which is subject to being selectively used to produce one of a plurality of emblem images of said exposures, said emblem images capable of being remotely positioned from and stationary relative to said vehicle.

2. The improved wheel system of claim 1 wherein said hologram assembly includes a reflection hologram.

3. The improved wheel system of claim 2 wherein said hologram assembly includes a plurality of reflection holograms, each reflection hologram being associated with a different emblem image.

4. The improved wheel system of claim 3 wherein each emblem image produced through a range of illumination angles, each range being substantially the same as one another, each illumination angle in a respective range describing the angle of illumination between the sunlight and said hologram assembly.

5. The improved wheel system of claim 1 wherein said exposures have a reconstruction angle of illumination that is substantially the same as one another 6. The improved wheel system of claim 1 wherein said hologram assembly produces substantially only one emblem image at a time.

7. The improved wheel system of claim 1 wherein said emblem images are one of a real image and a virtual image.

8. In a vehicle, an emblematic wheel cover, comprising:
   a rotating exterior portion which, when said wheel cover is fixed on a wheel of a vehicle, is in a position to be exposed to a moving point source of sunlight; and
   a reflection hologram assembly fixed on said exterior portion so that said hologram assembly may be exposed to said point source of sunlight through a reconstruction range of illumination angles as said point source of sunlight moves relative to said hologram assembly, said hologram assembly for producing a plurality of emblem images, a single emblem image being selectively produced upon said point source of sunlight illuminating one of a plurality of exposures contained in said hologram assembly.

9. The wheel cover of claim 8 wherein said hologram assembly is made of glass and dichromated gelatin.

10. The wheel cover of claim 8 wherein said hologram assembly is embossed onto a substrate.

11. The wheel cover of claim 8 further including an abrasion and resistant layer on said hologram assembly.

12. The wheel cover of claim 8 wherein said emblem images are substantially identical in configuration and dimension.

13. The wheel cover of claim 8 wherein said emblem images are different from one another.

14. The wheel cover of claim 8 wherein said reconstruction range includes illumination angles that differ over a range of about 5 degrees.

15. The wheel cover of claim 8 wherein said emblem images are similar to one another, each emblem image capable of being seen by a viewer located at a first position remote from said exterior portion wherein said emblem image appears to said viewer to be at a second position remote from said exterior portion and stationary relative to the vehicle.

16. In a vehicle, a wheel cover with spatially stabilized images, comprising:
   a rotatable support portion that may be exposed to one of sunlight and an artificial light source at a first position that is removed from said wheel cover; and
   a hologram assembly having a plurality of reflection hologram elements, each hologram element for providing an emblem image of one of a same emblem and a different emblem image from each other, each emblem image capable of being produced at a second position remote from said hologram assembly and said support portion such that said emblem image remains in substantially one stationary position relative to the vehicle.

17. The wheel cover of claim 16 wherein said hologram elements are stacked upon one another in a multi-layered construction.

18. The wheel cover of claim 16 wherein said hologram elements are in a single layer construction.

19. The wheel cover of claim 16 wherein said emblem images are produced by illumination onto said hologram assembly within a reconstruction range of illumination angles, said reconstruction range being defined by two orthogonal axes.

* * * * *